Jan. 10, 1961  W. WOBBE  2,967,523
CONTROL DEVICE FOR HOT WATER SYSTEMS
Filed May 23, 1957
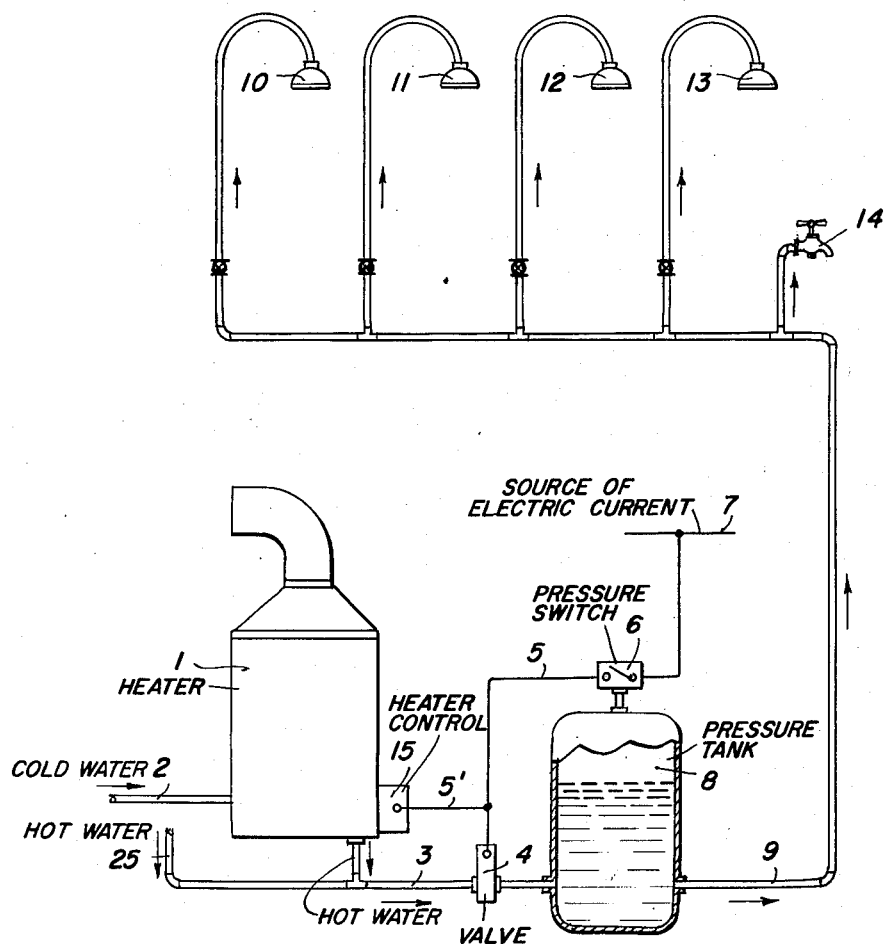
INVENTOR
WALTER WOBBE
BY
PATENT AGENT

2,967,523
CONTROL DEVICE FOR HOT WATER SYSTEMS

Walter Wobbe, Wachtstrasse 27, Bremen, Germany

Filed May 23, 1957, Ser. No. 661,073

Claims priority, application Germany May 26, 1956

3 Claims. (Cl. 126—362)

This invention relates to a control device for a continuous water heater of the type using either gas, oil or electricity, etc.

The usual continuous water heater systems without this control have the disadvantage that they have no supply of hot water in readiness, that they do not work when only a little water is used, that the temperature of the water supplied varies over a wide range and that when a considerable quantity of water is drawn off, scalding water is followed shortly by cold water. In addition, they are difficult to regulate by means of a thermostat and it is difficult to enlarge already existing systems. Prior to this invention, a supply heater had to be used in order to avoid these serious drawbacks. Such supply heaters have the disadvantage that they cost considerably more to install, that they are rather bulky and, in addition, they have the disadvantage that when the supply of hot water is exhausted, a long heating time is required, during which time no hot water is available.

It is an object of the present invention to obviate the above disadvantages and, at the same time, to unite the advantages of the continuous heater with those of the supply heater.

The hot water heaters according to the present invention provide an adequate supply of hot water, operate satisfactorily when only a very small amount of water is used and maintain comparatively even water temperature which can be regulated by thermostats. In addition, the present heaters are moderate in cost and require only a minimum of space. Furthermore, the present heaters require only a short heating period, provide a larger output and can be used continuously.

In accordance with present practice, control devices, such as an electrically operated valve and a pressure operated switch connected with a pressure tank are all attached to a continuous heater in such a way that, when the pressure in the tank falls, such as when hot water is being drawn off, the continuous water heater is switched on and, conversely, when the pressure in the tank rises, the heater is switched off. The connection of a pressure tank, pressure-operated switch and a valve controlled thereby for opening or closing the water supply pipe is already known, but it has not heretofore been used in combination with means for the control of a continuous water heater.

The control device according to the present invention operates in such a way, that when hot water is used, the pressure in the tank falls until the associated pressure switch operates to open a valve which is situated in the water supply pipe. When this valve is opened, cold water flows from the supply pipe into the continuous heater which is turned on to heat the water. During the time that the pressure in the tank is below a predetermined level, the valve is maintained open. However, when the pressure in the tank rises, i.e., when no more water is being withdrawn from the tank, the pressure switch is actuated to close the valve in the supply line and, at the same time, to turn off the continuous water heater located in the supply line ahead of the pressure tank.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The drawing shows a schematic diagram of a system according to the present invention.

In the drawing, a continuous heater 1 is provided with a cold water supply pipe 2 and a hot water outlet pipe 3. In control of the flow of water through the pipe 3 there is a valve 4 which is connected by an electric wire 5 with a source of electric current 7 through a pressure switch 6. The hot water pipe 3 through the valve 4 feeds into a pressure tank 8 having an outlet pipe 9 which leads to a plurality of faucets and taps 10 through 14 inclusive. The pressure switch 6 is connected in such a manner with the tank 8 that the switch 6 is closed whenever the pressure in the tank falls below a certain level, for instance, 15 lbs. per square inch. Conversely, the switch 6 is opened whenever the pressure in the tank 8 rises above a predetermined pressure, for example, 35 lbs. per square inch. The switch 6 thereby controls the flow of current from the source 7 to the wire 5 and also to another wire 5' which leads to a heater control box 15. When the water is withdrawn from the faucets, the pressure in the tank 8 falls and the switch 6 is thereby closed so as to energize both the valve 4 and the heater control 15, whereby the heater 1 is switched on and the valve 4 is opened, so as to permit hot water from the heater 1 to flow into the tank 8. The water entering the tank 8 builds up pressure within the tank 8 which is filled with hot water from the heater 1 until the pressure within the tank 8 has reached its predetermined maximum value (35 lbs. per square inch). At this point, the switch 6 is opened, the valve 4 is closed and the control box 15 turns off the heater 1. A pipe 25 coupled to the hot water outlet pipe 3 is provided so as to permit the inclusion of additional continuous heaters, as mentioned in the foregoing, for the purpose of supplying a greater demand.

I claim:

1. A hot water system for supplying heated water, comprising a consumer distribution pipe, an inlet pipe supplying cold water under pressure, a water heater connected to said inlet pipe to receive cold water therefrom; a pressure tank connected to said distribution pipe; a hot water pipe connecting said heater with said tank; a valve in control of the flow through said hot water pipe; control means for controlling the heating function of said heater; and pressure-actuated means responsive to the pressure in said tank and connected with said valve and with said control means, said pressure-actuated means turning on the heater and opening the valve whenever the pressure in the tanks falls by a predetermined amount below the pressure in the inlet pipe, and conversely closing the valve whenever the pressure in the tank is again built up.

2. In a system as set forth in claim 1, said valve being electrically actuated and said control means being electrically actuated, and said pressure-actuated means comprising an electrical switch connected between said valve and said control means and a source of electric power.

3. A hot water system for supplying heated water comprising a consumer distribution pipe, an inlet pipe supplying cold water under pressure, a water heater connected to said inlet pipe to receive cold water therefrom, a pressure tank connected to said distribution pipe, a hot water pipe connecting said heater with said tank, a valve in control of the flow through said hot water pipe, control means for controlling the heating function of said heater; and means actuated by the filling condition of said tank, said means connected to said valve and being adapted to open said valve when the water content in said tank falls below a predetermined minimum, and to turn off said valve when the filling of said tank is restored.

References Cited in the file of this patent

UNITED STATES PATENTS

| | | |
|---|---|---|
| 941,882 | Kinkade | Nov. 30, 1909 |
| 1,856,077 | Koch | May 3, 1932 |
| 2,399,985 | Chandler | May 7, 1946 |
| 2,429,916 | Belgau | Oct. 28, 1947 |
| 2,786,126 | Kendon | Mar. 19, 1957 |